US012699298B2

(12) United States Patent
Bosma et al.

(10) Patent No.: US 12,699,298 B2
(45) Date of Patent: Aug. 4, 2026

(54) ELECTRO-OPTICAL DEVICE WITH INTEGRATED LIGHT SOURCES

(71) Applicant: Gentex Corporation, Zeeland, MI (US)

(72) Inventors: Bradley A. Bosma, Hudsonville, MI (US); Ethan J. Lee, Byron Center, MI (US); Xiaoxu Niu, Grand Rapids, MI (US); Kurtis L Geerlings, Zeeland, MI (US); Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 324 days.

(21) Appl. No.: 18/502,267

(22) Filed: Nov. 6, 2023

(65) Prior Publication Data

US 2024/0152017 A1 May 9, 2024

Related U.S. Application Data

(60) Provisional application No. 63/423,172, filed on Nov. 7, 2022.

(51) Int. Cl.
| | |
|---|---|
| *G02F 1/157* | (2006.01) |
| *B60J 3/04* | (2006.01) |
| *G02F 1/155* | (2006.01) |

(52) U.S. Cl.
CPC .............. *G02F 1/157* (2013.01); *G02F 1/155* (2013.01); *B60J 3/04* (2013.01)

(58) Field of Classification Search
None
See application file for complete search history.

(56) References Cited

U.S. PATENT DOCUMENTS

| | | | |
|---|---|---|---|
| 6,407,847 B1 | 6/2002 | Poll et al. | |
| 6,556,260 B1 * | 4/2003 | Itou .................. | G02F 1/133603 |
| | | | 349/113 |
| 9,383,092 B2 | 7/2016 | Navabi | |
| 9,806,281 B2 | 10/2017 | Domercq et al. | |
| 10,126,624 B2 | 11/2018 | Cammenga et al. | |
| 10,767,838 B2 | 9/2020 | Kostelnik | |
| 10,948,163 B2 | 3/2021 | Lee | |

(Continued)

FOREIGN PATENT DOCUMENTS

WO 2007055455 A1 5/2007

*Primary Examiner* — Ryan Crockett
(74) *Attorney, Agent, or Firm* — Price Heneveld LLP; Brian James Brewer

(57) ABSTRACT

An electro-optic device includes a first substrate that has a first surface and a second surface. A second substrate has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. At least one third electrode layer is disposed adjacent to one of the first electrode layer and the second electrode layer. At least one light source operably electrically interposes the at least one third electrode layer and the one of the first electrode layer or the second electrode layer that is adjacent to the at least one third electrode layer.

17 Claims, 10 Drawing Sheets

(56)             References Cited

U.S. PATENT DOCUMENTS

| | | | |
|---|---|---|---|
| 2007/0153515 A1* | 7/2007 | Hong | G02F 1/133603 |
| | | | 362/241 |
| 2008/0068520 A1 | 3/2008 | Minikey, Jr. et al. | |
| 2011/0141542 A1 | 6/2011 | Schofield et al. | |
| 2017/0100991 A1* | 4/2017 | Cammenga | G02F 1/1533 |
| 2019/0143914 A1 | 5/2019 | Uken et al. | |
| 2019/0351828 A1 | 11/2019 | McCabe et al. | |
| 2021/0095822 A1 | 4/2021 | Xu | |
| 2021/0277711 A1* | 9/2021 | Neuman | B32B 17/1022 |
| 2021/0341810 A1* | 11/2021 | Iwai | G09F 9/00 |
| 2022/0050329 A1* | 2/2022 | Sun | G02F 1/1339 |
| 2022/0165785 A1 | 5/2022 | Liao et al. | |
| 2022/0171245 A1 | 6/2022 | Tonar et al. | |
| 2024/0111188 A1* | 4/2024 | Hou | G02B 6/0055 |
| 2025/0046261 A1* | 2/2025 | Sahlsten | G09G 3/3426 |

* cited by examiner

ELECTRO-OPTICAL DEVICE WITH INTEGRATED LIGHT SOURCES

CROSS-REFERENCE TO RELATED APPLICATION

This application claims priority to and the benefit under 35 U.S.C. § 119(e) of U.S. Provisional Application No. 63/423,172, filed on Nov. 7, 2022, entitled "ELECTRO-OPTICAL DEVICE WITH INTEGRATED LIGHT SOURCES," the disclosure of which is hereby incorporated herein by reference in its entirety.

TECHNOLOGICAL FIELD

The present disclosure relates generally to an electro-optic device that incorporates at least one light source and, more particularly, an electro-optic device that has an electro-optic element and a plurality of light sources that share an electrical connection with the electro-optic element.

SUMMARY OF THE DISCLOSURE

According to an aspect of the present disclosure, a device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. At least one third electrode layer is disposed adjacent to one of the first electrode layer and the second electrode layer. At least one light source operably electrically interposes the at least one third electrode layer and the one of the first electrode layer or the second electrode layer that is adjacent to the at least one third electrode layer.

According to another aspect of the present disclosure, an electro-optic device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. A light source substrate includes a plurality of traces leading to a plurality of light sources, at least some of the plurality of light sources are aligned within a perimeter of the electro-optic medium and oriented to project illumination towards a viewing surface.

According to yet another aspect of the present disclosure, an electro-optic device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. A plurality of light sources located between the first surface and the fourth surface and disposed in a pattern at least partially aligned within a perimeter of the electro-optic medium and oriented to project illumination towards the first surface.

These and other features, advantages, and objects of the present device will be further understood and appreciated by those skilled in the art upon studying the following specification, claims, and appended drawings.

Figure 1:
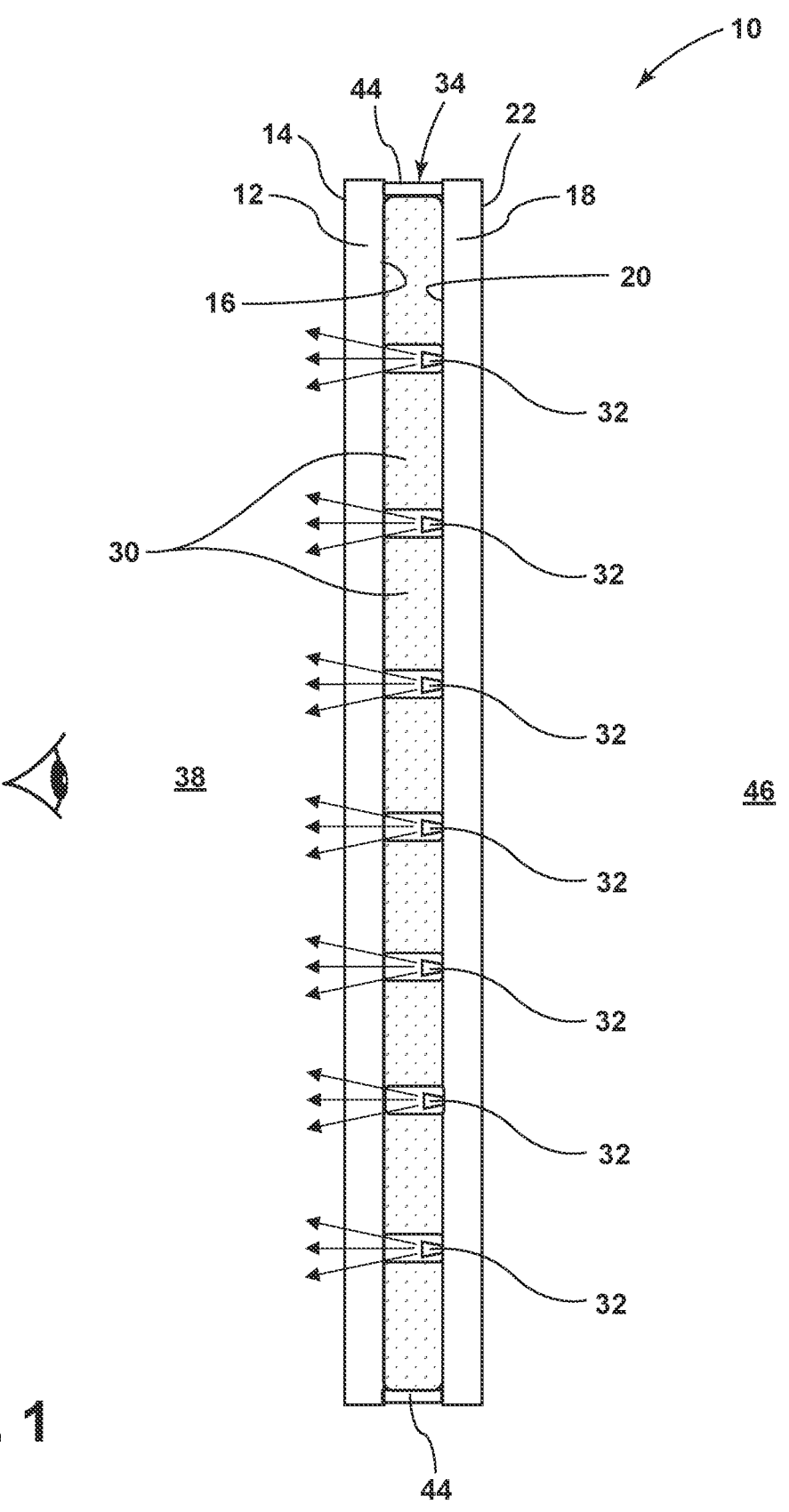
FIG. 1 is a side cross-sectional view of an electro-optic device according to a first construction that incorporates a plurality of light sources disposed in a region of an electro-optic medium, according to an aspect of the present disclosure.

The components in the figures are not necessarily to scale, emphasis instead being placed upon illustrating the principles described herein.

DETAILED DESCRIPTION OF EMBODIMENTS

The present illustrated embodiments reside primarily in a combination of apparatus components related to an electro-optic device with integrated light emitters. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the electro-optic device, and the term "rear" shall refer to the surface of the element further from the intended viewer of the electro-optic device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
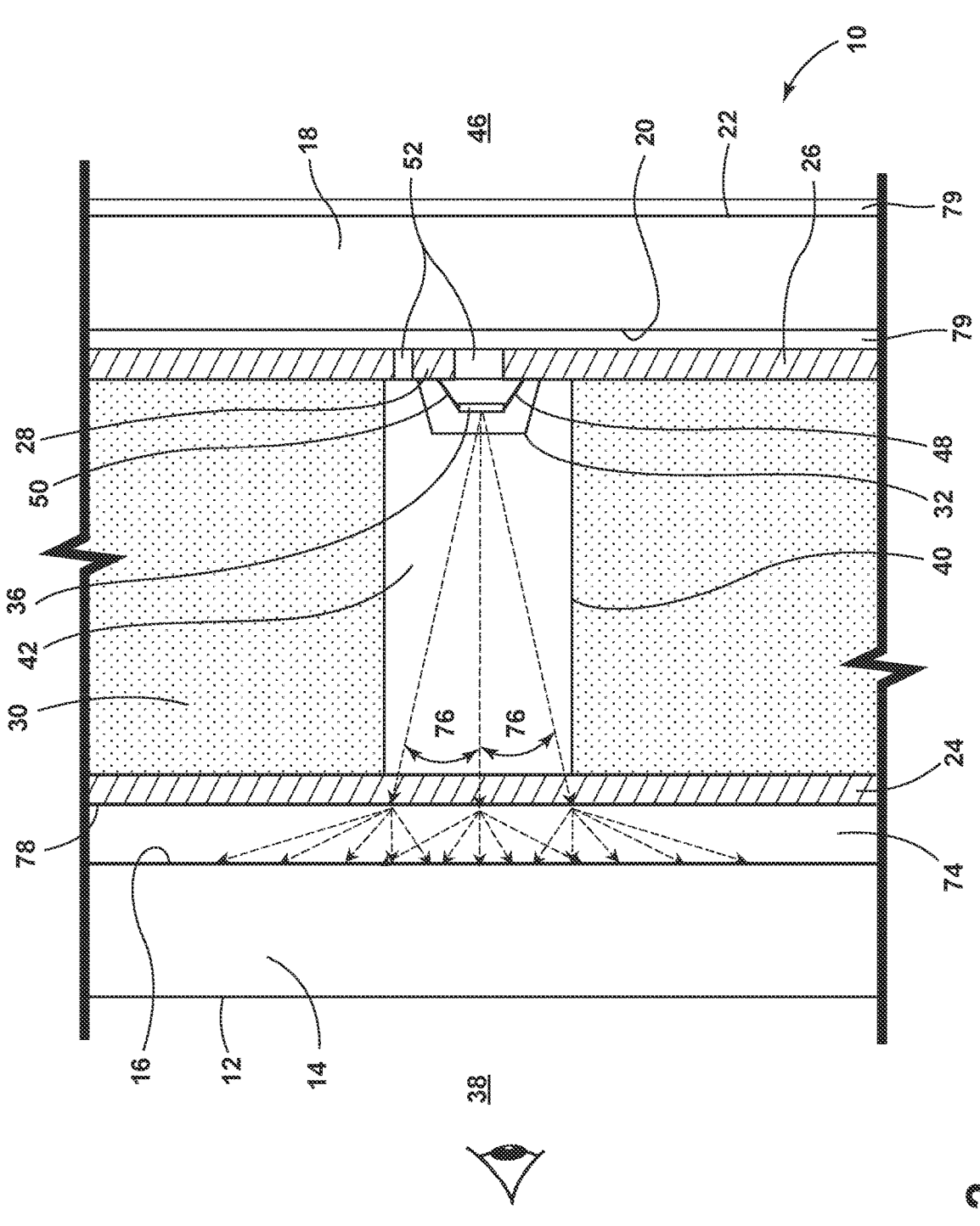
FIG. 2 is an enlarged partial cross-sectional view of an electro-optic device according to a first construction with a rear-mounted light source in a region of an electro-optic medium, according to an aspect of the present disclosure.

Referring to FIGS. 1 and 2, reference numeral 10 generally refers to an electro-optic device in accordance with a first construction. The electro-optic device 10 includes a first substrate 12 that has a first surface 14 and a second surface 16. The electro-optic device 10 further includes a second substrate 18 that is spaced from the first substrate 12 and has a third surface 20 and a fourth surface 22. A first electrode layer 24 is associated with the second surface 16, and a second electrode layer 26 is associated with the third surface 20 (FIG. 2). An electro-optic medium 30 is disposed between the first and second electrode layers 24, 26. The electro-optic medium 30 is operable between substantially activated and substantially unactivated states based on exposure to an electric potential between the first and second electrode layers 24, 26. The electro-optic device 10 may further include at least one third electrode layer 28 (FIG. 2) disposed on the second surface 16. At least one light source 32 is electrically interposed (e.g., electrically coupled) with the second electrode layer 26 and the at least one third electrode layer 28.

With continued reference to FIGS. 1 and 2, as referred to herein, the first substrate 12, the second substrate 18, the first and second electrodes 24, 26, and the electro-optic medium 30 may be referred to herein as an electro-optic element 34. Components of the electro-optic element 34 may be in electrical communication with the at least one light source 32 that may be rear-mounted. More particularly, the at least one light source 32 may be connected directly to the second electrode layer 26, adjacent to the second substrate 18. The at least one light source 32 may include a plurality of light sources 32, and each light source 32 may be configured as a light-emitting diode (LED) 36. The at least one light source 32 illuminates, from the rear-mounted location, in a direction towards the first substrate 12. Selective activation of the at least one light source 32 may limit a level of absorption, reflection, or scattering through the electro-optic element 34. The at least one light source 32 may, therefore, limit a reflectance on a user side 38 (i.e., front side) of the electro-optic device 10. More particularly, in the activated state, the electro-optic medium 30 is darkened to limit transmission of light. As the electro-optic medium 30 becomes darker, perceived reflectance of the electro-optic device 10 increases as a result of changes to levels of absorption, reflection, and scattering. In this manner, the at least one light source 32 is positioned to illuminate towards the user (i.e., the user side 38) to limit the effects of darkening on reflection. It should be appreciated that depending on end-use of the electro-optic device 10 (i.e., relative location of an intended viewer), the user side 38 may refer to an interior of a structure (e.g., a vehicle) incorporating the electro-optic device 10, an exterior of a structure (e.g., the vehicle) incorporating the electro-optic device 10, or any other target viewing side from which a user is intended to view the electro-optic device 10. It should be appreciated that, depending on the implementation, the electro-optic device 10 may be substantially planar, curved, or other shapes. For example, the first and second substrates 12, 18 and, by extension, the first and second electrodes 24, 26, may each be planar, curved, or other shapes.

With reference now to FIG. 2, the at least one light source 32 may be encased, or otherwise isolated from the electro-optic medium 30, via a barrier 40 that at least partially covers each of the at least one light source 32. The barrier 40 may be an epoxy, a hardened liquid resin, a laminate layer covering each of the at least one light source 32, or other protective material for limiting contact of the electro-optic medium 30 with the at least one light source 32. In some embodiments, the epoxy may be clear in order to allow for light transmission (e.g., to or from the user side 38). The electrical isolation of the electro-optic medium 30 relative to the at least one light source 32 may protect the at least one light source 32 from exposure to various metal oxides that may be present in the electro-optic medium 30 and thereby may limit undesired electrical conductance (e.g., shorting) for each of the at least one light source 32. In the first construction, the barrier 40 may incorporate a potting material 42 that is substantially transparent to allow transmittance of light therethrough from the rear-mounted location. Each of the light sources 32 may be encased in the barrier 40, potting material 42, and/or other solid or gelatinous compounds that provide vibrational and other types of operational protection to the light sources 32. The barrier 40 may extend between the first and second electrode layers 24, 26 or, alternatively, be confined within close proximity to the light sources 32.

With reference to FIGS. 1 and 2, a seal 44 may be disposed between the first substrate 12 and the second substrate 18, encircling and confining the electro-optic medium 30. A rear side 46 of the electro-optic device 10 may oppose the user side 38. With reference now back to FIG. 2, the light sources 32 (e.g., the LEDs 36) may each include a first electrical conductor 48 coupled with the second electrode layer 26 and a second electrical conductor 50 connected with the at least one third electrode layer 28. In this manner, a conductive path is completed through the at least one third electrode layer 28 and the second electrode layer 26 via the first and second conductors 48, 50. The at least one third electrode layer 28 and the second electrode layer 26 may be spaced from one another by a conductivity gap 52 to prevent electrical shorting between the second electrode layer 26 and the at least one third electrode layer 28. More particularly, the conductivity gaps 52 may be defined by openings (e.g., spaces with non-conductive material) in the second electrode layer 26 and each third electrode layer 28 may be located in a different one of the openings. In this manner, the at least one third electrode layer 28 and the second electrode layer 26 may be substantially co-planar but out of contact with one another.

With continued reference to FIG. 2, a diffractive optical element 74 may be optically coupled with the first substrate 12 (e.g., the first surface 14 or the second surface 16) and is configured to scatter light emitted from the light source 32 and allow natural light (e.g., sunlight) to pass through substantially unscattered. For example, the diffractive optical element 74 may incorporate diffracted grating that is configured to scatter light that enters the diffractive optical element 74 within a threshold projection angle 76 relative to an entry surface 78 of the diffractive optical element 74. For example, the diffracted grating may be configured to scatter light that enters the defective optical element within the range of 45°, 30°, 20°, 10°, 5°, or less relative to the entry surface 78, which may correspond to the angle at which light emitted from the light sources 32 projects. Because natural light passing through the electro-optic device 10 may have a relatively broad wavelength (e.g., an angle of entry greater than the threshold projection angle 76), the diffractive optical element 74 may be configured to scatter the light emitted by the light sources 32 (e.g., LEDs 36) to provide a substantially uniform light plane through the electro-optic device 10 thus limiting haze. The second electrode layer 24 may be substantially transparent or define a transmission gap to permit illumination from the at least one light source 32 therethrough. In some embodiments, a reflective layer 79 is located on an opposite side of the second electrode layer 26 than the electro-optic medium 30. For example, the reflective layer 79 may be disposed on the third or fourth surfaces 20, 22 of the second substrate 18. In this manner, the electro-optic device 10 may function as a mirror when the electro-optic medium 30 is in the inactive, transmissive state. In other embodiments, the electro-optic medium 30 may be electrochromic and configured to switch between reflective and transparent states.

Figure 3:
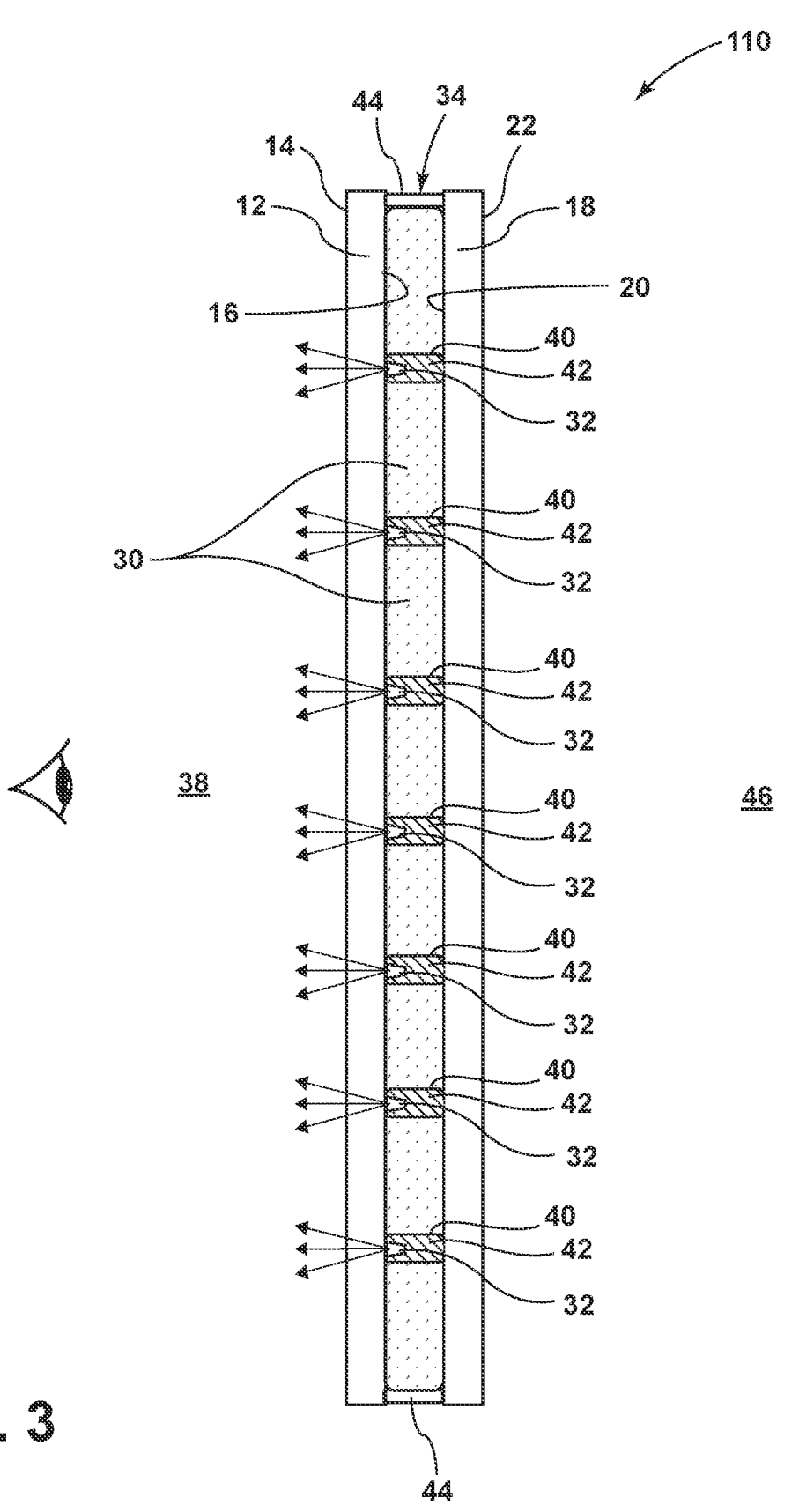
FIG. 3 is a side cross-sectional view of another electro-optic device according to a second construction that incorporates a plurality of light sources disposed in a region of an electro-optic medium, according to an aspect of the present disclosure.
Figure 4:
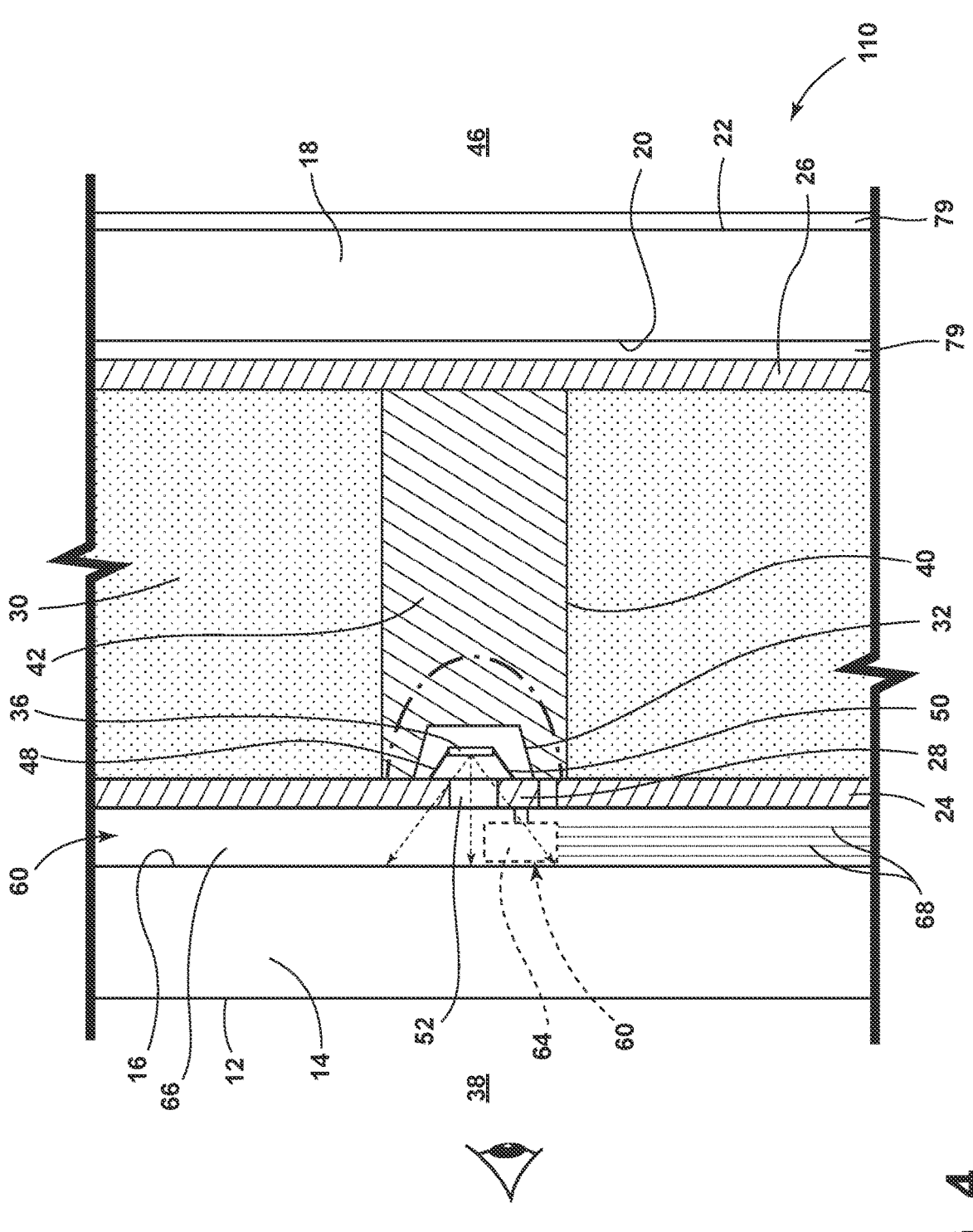
FIG. 4 is an enlarged cross-sectional view of an electro-optic device according to a second construction with a front-mounted light source in a region of an electro-optic medium, according to an aspect of the present disclosure.

Referring now to FIGS. 3 and 4, an electro-optic device 110 is illustrated in accordance with a second construction. Unless otherwise stated, the second construction may share all of the same features, materials, constructions, and operational principles and may be incorporated in the same structures as the other constructions described herein. More particularly, the electro-optic device 110 includes the at least one light source 32 that is front-mounted. In the front-mounted location, the at least one light source 32 (e.g., LEDs 36) is disposed adjacent to the user side 38 of the electro-optic device 110. For example, the at least one light source 32 may be operably coupled with the first electrode layer 24 on the second surface 16 and be configured to project light through the first substrate 12 and towards the user side 38. The at least one light source 32 may be encased or otherwise inside the electro-optic element 34. The barrier 40 at least partially covers each of the at least one light source 32 surrounded by the electro-optic medium 30. The barrier 40 may be an epoxy, a hardened liquid resin, a laminate layer covering each of the at least one light source 32, or other protective material for limiting contact of the electro-optic medium 30 with the at least one light source 32. The electrical isolation of the electro-optic medium 30 relative to the at least one light source 32 may protect the at least one light source 32 from exposure to various metal oxides that may be present in the electro-optic medium 30 and thereby may limit undesired electrical conductance (e.g., shorting) for each of the at least one light source 32. In some embodiments, the barrier 40 may incorporate the potting material 42 and the potting material 42 may be dark in color to be visually cohesive with the appearance of the electro-optic element 34 in the substantially activated state (e.g., the darkened state). Because the at least one light source 32 is front-mounted and projects light directly through the first substrate 12 (i.e., not through the barrier 40 and/or the potting material 42) the potting material 42 will not affect the transmittance properties of the at least one light source 32 to the user side 38. Each of the light sources 32 may be encased in the barrier 40, potting material 42, and/or other solid or gelatinous compounds that provide vibrational and other operational protection to the light sources 32. The barrier 40 may extend between the first and second electrode layers 24, 26 or, alternatively, be confined within close proximity to the light sources 32.

With reference now to FIG. 4, the light sources 32 (e.g., the LEDs 36) may be operably coupled to the first electrode layer 24 and the at least one third electrode layer 28. Each light source 32 may include the first electrical conductor 48 coupled with the first electrode layer 24 and the second electrical conductor 50 connected with the at least one third electrode layer 28. In this manner, a conductive path is completed through the at least one third electrode layer 28 and the first electrode layer 24 via the first and second conductors 48, 50. The at least one third electrode layer 28 and the first electrode layer 24 may be spaced from one another by the conductivity gap 52 to prevent electrical shorting between the first electrode layer 24 and the at least one third electrode layer 28. More particularly, the conductivity gaps 52 may be defined by openings (e.g., spaces with non-conductive material) in the first electrode layer 24 and each third electrode layer 28 may be located in a different one of the openings. In this manner, the at least one third electrode layer 28 and the first electrode layer 24 may be substantially co-planar. In some embodiments, each of the conductivity gaps 52 may be sized and located to also permit illumination from the at least one light source 32 therethrough. In some embodiments, transmission gaps that are located to permit illumination from the at least one light source 32 are provided that are distinct from the conductivity gaps 52. However, it should be appreciated that the electrode layers, 24, 26, and 28 and the first and second conductors 48, 50 may be substantially transparent to permit illumination from the at least one light source 32 therethrough.

With continued reference to FIG. 4, the electro-optic device 110 may further include a switching circuit region 60 that includes a switching device 62 associated with the light sources 32. For example, the switching circuit region 60 may include a plurality of thin film transistors 64 embedded in a polymer insulation material 66, with each of the plurality of thin film transistors 64 being employed to control activation of one of the at least one light sources 32. The switching circuit region 60 may further incorporate additional electrode layers 68, such as a plurality of traces or a conductive backplane leading to the light sources 32, embedded in the insulation material 66 of the switching circuit region 60 that may provide electrical communication between each of the transistors 64 and a control circuit 70

Figure 7:
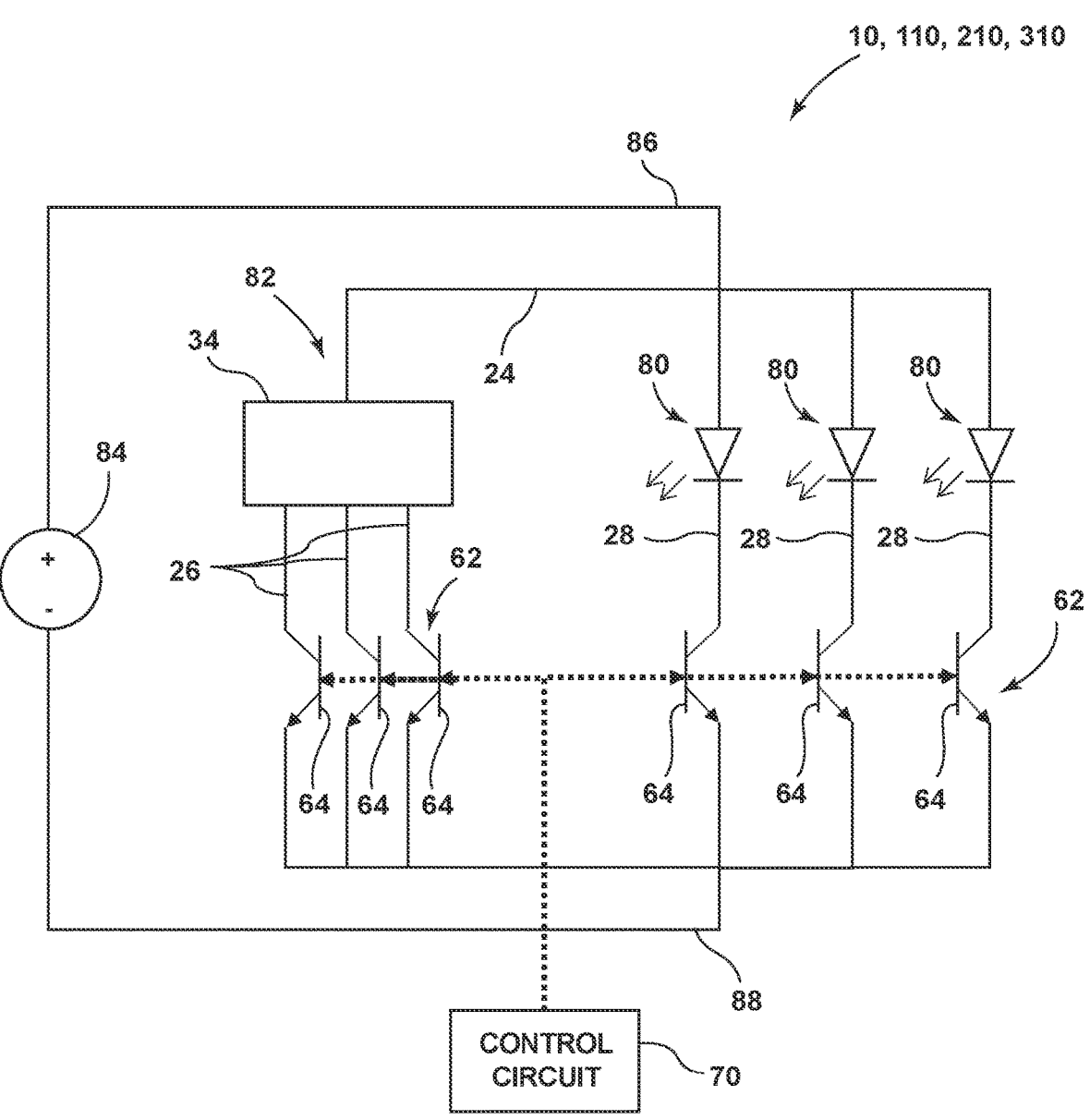
FIG. 7 is an electrical schematic of an electro-optic device, according to an aspect of the present disclosure.

(FIG. 7). The control circuit 70 is configured to selectively activate each of the transistors 64 to control illumination of the light sources 32. It is contemplated that the electrode layers of the present disclosure (e.g., the first, second, third, and additional electrode layers 24, 26, 28, and 68) may comprise substantially transparent oxide materials, such as indium tin oxide or other metal oxides to limit light diffraction through the electro-optic device 10. Although illustrated as extending between the first and second electrode layers 24, 26, it is contemplated that the barrier 40 and/or potting material 42 may project only from the electro-optic element 34 in a direction of the user side 38. While not explicitly illustrated, the switching circuit region 60 and features associated therewith may be incorporated into the first construction, where the switching circuit region 60 is located between the third surface 20 of the second substrate 18 and the at least one light source 32.

With continued reference to FIG. 4, the electo-optic device 110 may omit the active switching circuit region 60 and, alternatively, may provide for passive control of the light sources 32 in other arrangements. For example, the passive control of the light sources 32 may be through whichever of the electrode layers 24, 26, 28, and 68 the light source 32 is in contact with. In some embodiments, the passive control of the light sources 32 may occur along an outer perimeter or other locations (e.g., away from the electro-optic device 110). For example, the at least one third electrode layer 28 may include the plurality of additional electrode layers 68 (e.g., a plurality of traces or backplane) disposed side-by-side with the first electrode layer 24. As previously described, the plurality of traces may be positioned between the first electrode layer 24 and the first substrate 12. The plurality of additional electrode layers 68 may cover an area facing the electro-optic medium 30 that is significantly less than an area of the first electrode layer 24 interfacing with the electro-optic medium 30. For example, at least 60%, 70%, 80%, 90%, 95%, or 99% of an interface surface between the first electrode layer 24 and the plurality of additional electrode layers 68 with the electro-optic medium 30 may be occupied by the first electrode layer 24 to allow for sufficiently darkened activated states of the electro-optic device 110. In some embodiments, a reflective layer 79 is located on an opposite side of the second electrode layer 26 than the electro-optic medium 30. For example, the reflective layer 79 may be disposed on the third or fourth surfaces 20, 22 of the second substrate 18. In this manner, the electro-optic device 110 may function as a mirror when the electro-optic medium 30 is in the unactive, transmissive state. In other embodiments, the electro-optic medium 30 may be electrochromic and configured to switch between reflective and transparent states.

Figure 5:
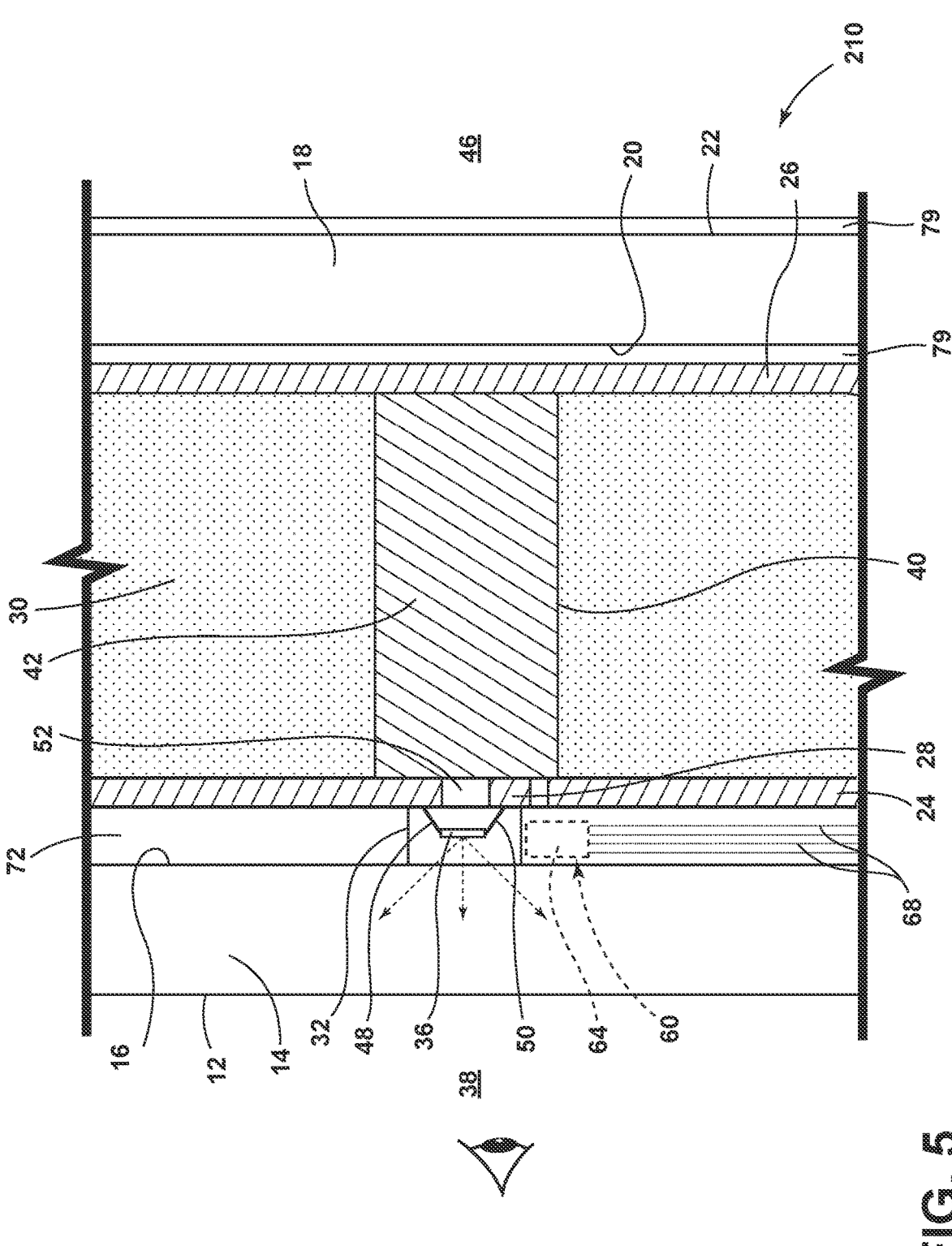
FIG. 5 is an enlarged cross-sectional view of an electro-optic device according to a third construction with a front-mounted light source disposed in a region outside of an electro-optic medium, according to an aspect of the present disclosure.

Referring now to FIG. 5, an electro-optic device 210 is illustrated in accordance with a third construction. Unless otherwise stated, the third construction may share all of the same features, materials, constructions, and operational principles and may be incorporated in the same structures as the other constructions described herein. More particularly, the electro-optic device 210 includes the at least one light source 32 that is front-mounted but located outside of the electro-optic element 34 (e.g., between the first substrate 12 and the first electrode layer 24). The light sources 32 (e.g., the LEDs 36) may be operably coupled to the first electrode layer 24 and the at least one third electrode layer 28. Each light source 32 may include the first electrical conductor 48 coupled with the first electrode layer 24 and the second electrical conductor 50 connected with the at least one third electrode layer 28. In this manner, a conductive path is completed through the at least one third electrode layer 28 and the first electrode layer 24 via the first and second conductors 48, 50. The at least one third electrode layer 28 and the first electrode layer 24 may be spaced from one another by the conductivity gap 52 to prevent electrical shorting between the first electrode layer 24 and the at least one third electrode layer 28. More particularly, the conductivity gaps 52 may be defined by openings (e.g., spaces with non-conductive material) in the first electrode layer 24 and each third electrode layer 28 may be located in a different one of the openings. In this manner, the at least one third electrode layer 28 and the first electrode layer 24 may be substantially co-planar.

With continued reference to FIG. 5, the at least one light source 32 may be passively controlled. For example, a carrier 72, that may be substantially transparent, is configured to house the light sources 32. In some embodiments, the carrier 72 is a laminate with the light sources 32 embedded therein. Similar to the switching circuit region 60 previously described, the carrier 72 may define a third electrode layer 28 (e.g., a plurality of traces or a conductive backplane) electrically coupled with the third electrode layer 28 and extending to an edge of the electro-optic device 210. In this manner, the switching devices 62 (e.g., transistors 64) may be employed off of the electro-optic device 210 or along an outer perimeter of the electro-optic device 210 for controlling the light sources 32. The at least one light source 32 may be deposited on the carrier 72 via vacuum deposition methods, evaporation, or solution phase depositions method, such as inkjet and slot die applications. It is contemplated that, in this example, the barrier 40 may be omitted as the light sources 32 are located outside of the electro-optic medium 30. While not explicitly disclosed, the carrier 72 and features associated therewith may be incorporated into the first construction, where the carrier 72 is located between the third surface 20 of the second substrate 18 and the second electrode layer 24 while the at least one light source 32 is encased therein. In such arrangements, the barrier 40 and/or potting material 42 may be omitted. In some embodiments, a reflective layer 79 is located on an opposite side of the second electrode layer 26 than the electro-optic medium 30. For example, the reflective layer 79 may be disposed on the third or fourth surfaces 20, 22 of the second substrate 18. In this manner, the electro-optic device 210 may function as a mirror when the electro-optic medium 30 is in the unactive, transmissive state. In other embodiments, the electro-optic medium 30 may be electrochromic and configured to switch between reflective and transparent states.

Figure 6:
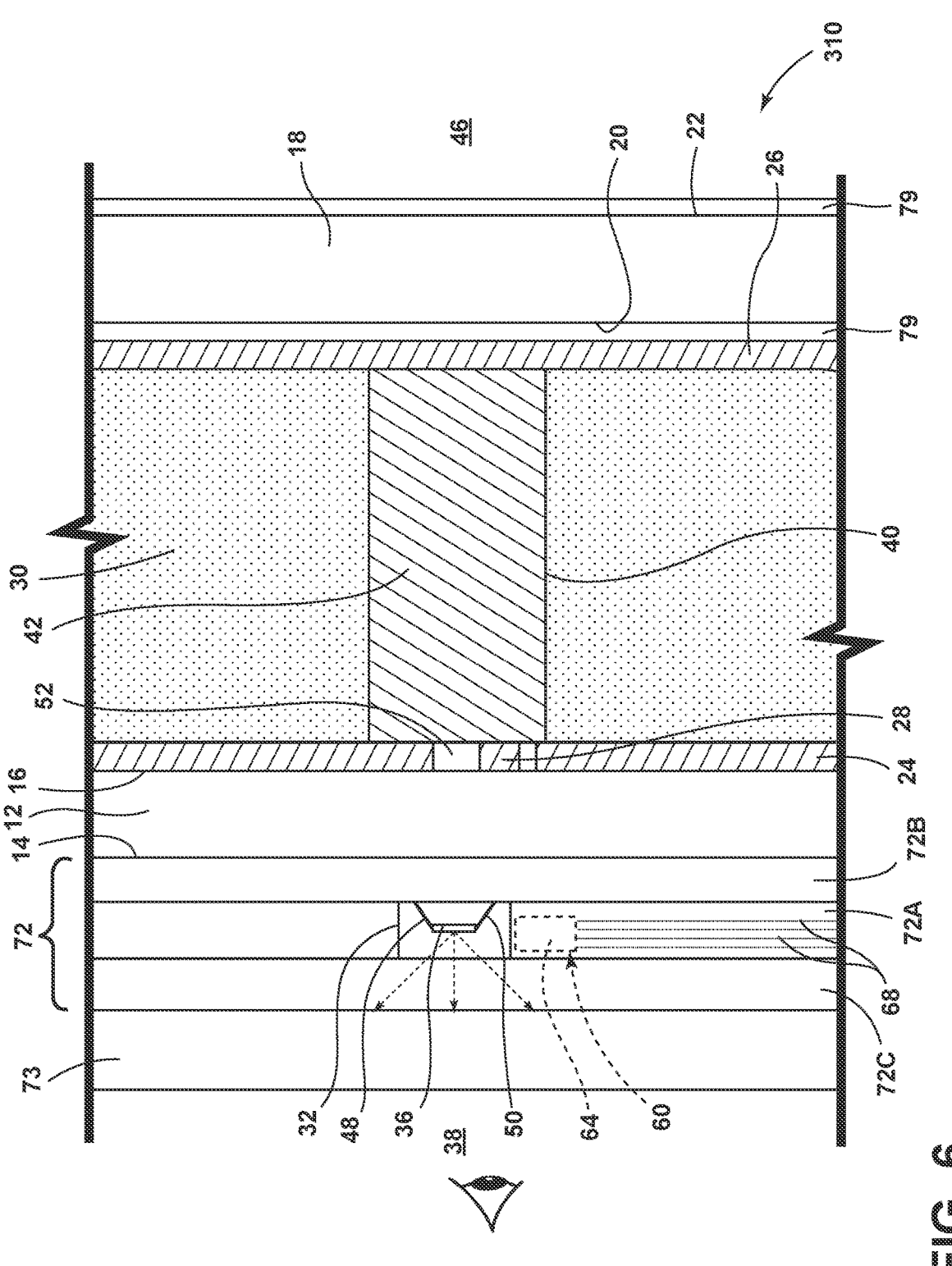
FIG. 6 is an enlarged cross-sectional view of an electro-optic device according to a fourth construction with a front-mounted light source disposed in a region outside of an electro-optic medium, according to an aspect of the present disclosure.

With reference now to FIG. 6, an electro-optic device 310 is illustrated in accordance with a fourth construction. Unless otherwise stated, the fourth construction may share all of the same features, materials, constructions, and operational principles and may be incorporated in the same structures as the other constructions described herein. More particularly, the carrier 72 in the electro-optic device 310 includes several sub-layers. More particularly, the carrier 72 includes a light source substrate 72A disposed between a first insulating layer 72B and a second a second insulating layer 72C. The light source substrate 72A may include a conductive material or an insulating material with a plurality of traces (e.g., the third electrode layer 28). In this manner, each light source 32 may be powered directly from the third electrode layer 28 (e.g., the plurality of traces) rather than the first and second electrode layers 24, 26. The first and second insulating layers 72B, 72C may be formed on a laminate. In some embodiments, the first and second insulating layers 72B, 72C may be separate layers that are spaced from one another by the light source substrate 72A. In some embodiments, the first and second insulating layers 72B, 72C may be integral and the light source substrate 72A may be suspended between the first and second insulating layers 72B, 72C. The light source substrate 72A may include a perimeter that at least partially extends beyond a perimeter of at least one of the first and second insulating layers 72B, 72C. In this manner, the portion of the light source substrate 72A perimeter extending beyond the perimeter of at least one of the first and second insulating layers 72B, 72C can make electrical contact with a power source (not shown). For example, in some embodiments, the light source substrate 72A perimeter includes a portion that extends beyond the perimeter of only one of the first and second insulating layers 72B, 72C (e.g., the second insulating layer 72C). In this manner, one of the first and second insulating layers 72B, 72C may include a smaller perimeter than the other of the first and second insulating layers 72B, 72C. In other embodiments, the light source substrate 72A perimeter includes a portion that extends beyond the perimeter of both the first and second insulating layers 72B, 72C. The carrier 72 may be located between the first substrate 12 and a third substrate 73 that defines a viewing surface of the electro-optic device 310.

With reference now to FIGS. 1-6, the conductivity gap 52, as well as the size of the light source 32 and the barrier 40, may be limited to the necessary spacing between the first and third electrode layers 24, 28 in order to provide for an expansive region of the electro-optic device 10, 110, 210, and 310. Stated differently, the regions in the electro-optic medium 30 corresponding to the light sources 32 may be minimized to optimize space in the electro-optic device 10 for the electro-optic functionality. In addition, it should be appreciated that the barrier 40 and potting material 42 described herein may also be a single homogenous material 40, 42 that achieves both functionalities. In other words, the barrier 40 may comprise the potting material 42. In some embodiments the light sources 32 in the electro-optic device 10, 110, 210, and 310 may be configured to receive power from sources other than the first and second electrode layers 24, 26. More particularly, the light sources 32 may receive power only from the third electrode layer 28, only from the additional electrode layer 68 (e.g., the plurality of traces or the backplane), or from a combination of the third electrode layer 28 and the additional electrode layer 68. In embodiments with a plurality of traces, activation of the light sources 32 may be localized (i.e., illuminating only select light sources 32). In embodiments with a third electrode layer 28 or an additional electrode layer 68 configured as a backplane, activation of the light sources 32 may be global (i.e., illuminating each light source 32). It should be appreciated that combinations of these configurations may be used to allow selective global or local activation of the light sources 32.

It is contemplated that the LEDs 36 may comprise discrete LEDs with standard packaging or bare dies, organic LEDs ("OLEDs"), mini-LEDs, or micro-LEDs. When the LEDs 36 are configured as discrete LEDs, a pick and place operation may be utilized to apply the light sources 32 to be electrically coupled with a shared electrode layer of the electro-optic element 34. It is further contemplated that the light source 32 may include an RGB LED operable to selectively emit a particular color light to create various light patterns, pitches, or hues for the electro-optic device 10 described herein. Further, the light source 32 may incorporate many LEDs 36 and/or micro-LED illumination sources in order to improve density of light sources and/or reduce overall package size of the electro-optic element 34. In some embodiments, the light sources 32 may be disposed on a thin film coating or may be coupled with the first, second, and/or third electrode layers 24, 26, and 28, via a conductive paste or tape (e.g., anisotropic conductive paste or tape), wire bonding, and/or other conductive bonding methods. In some embodiments, the electro-optic medium 30 includes electrochromic fluid that is selectively activated between the clear state and the darkened state.

It should be appreciated that features described in reference to the first through third constructions in FIGS. 1-6 may be incorporated in any of the other constructions. For example, the diffractive optical element 74 described in relation to FIG. 2 may be incorporated into any of other constructions, and the switching circuit region 60 described in relation to FIG. 4 may be incorporated into any of the described constructions on either side of the electro-optic element 34 (e.g., on a side of the first substrate 12 or on a side of the second substrate 18). In general, the electrical integration of the electro-optic element 34 and the light sources 32 may be achieved in any of the previously described constructions, or any combination of the previously described diffractive optical element 74, switching circuit region 60, carrier 72, or other optical layers.

Referring now to FIG. 7, an electrical schematic for an exemplary implementation of the light sources 32 and the electro-optic element 34 includes a plurality of light circuits 80 in parallel with one another and in parallel with a dimming circuit 82. The implementation in FIG. 7 may be employed by any of the previously described constructions. Each light circuit 80 includes one or more of the LEDs 36 previously described in series with a first transistor 64 configured to selectively activate the corresponding LED 36. The dimming circuit 82 includes the previously described electro-optic element 34 in series with one or more transistors 64 in the switching circuit region 60. It is contemplated that in some examples, the dimming circuit 82 does not include transistors disposed in the switching circuit region 60 and, instead, includes switching devices 62 spaced from the electro-optic device 10, 110, 210, and 310 or otherwise away from the user side 38 of the electro-optic device 10, 110, 210, and 310. It is also contemplated that the electro-optic element 34 as described herein may include a plurality of electro-optic segments that are each individually controlled by the transistors 64 of the dimming circuit 82.

In operation, electrical power is applied by power supply 84 across two power conductors 86, 88, each in communication with the dimming circuit 82 and the lighting circuits 80. For example, the first power conductor 86 may be electrically coupled with the first electrode layer 24, and the second conductor may be electrically coupled with the switching devices 62 of the dimming circuit 82 and the lighting circuits 80. The second electrode layer 26 of the electro-optic element 34 may be electrically coupled with a second power conductor 88 when the switching devices 62 for the dimming circuit 82 are activated by the control circuit 70. The at least one third electrode layer 28 between each LED 36 and corresponding switching device 62 may have electrical communication with the second power conductor 88 in response to the control circuit 70 activating the switching device 62 of the lighting circuit 80. In this way, the control circuit 70 may selectively activate the electro-optic element 34 and/or the LEDs 36. It is contemplated that, in some examples, the LEDs 36 may be activated when the electro-optic element 34 is activated in order to limit the reflection of light when the electro-optic device 10, 110, 210, and 310 is darkened by activation of electro-optic element 34. Thus, the switching devices 62 of the dimming circuit 82 may be omitted in some examples, such that the LEDs 36 may only be selectively activated when electrical potential is applied across the electro-optic element 34.

It is contemplated that various electrical combinations of the electro-optic element 34 and the light sources 32 may be employed by the electro-optic device 10, 110, 210, and 310 not described in detail herein. For example, a single lighting circuit 80 may include a plurality of LEDs 36 in parallel or in series with one another, controlled by a single transistor 64. In general, these various arrangements may allow for selective density of illumination, including selectively illuminating portions of the electro-optic device 10, 110, 210, and 310 as previously described. In some embodiments, the control circuit 70 may include a processor and a memory, with the memory storing instructions that, when executed by the processor, causes the control circuit 70 to communicate a signal to the switching devices 62 and other operations described herein.

Figure 8:
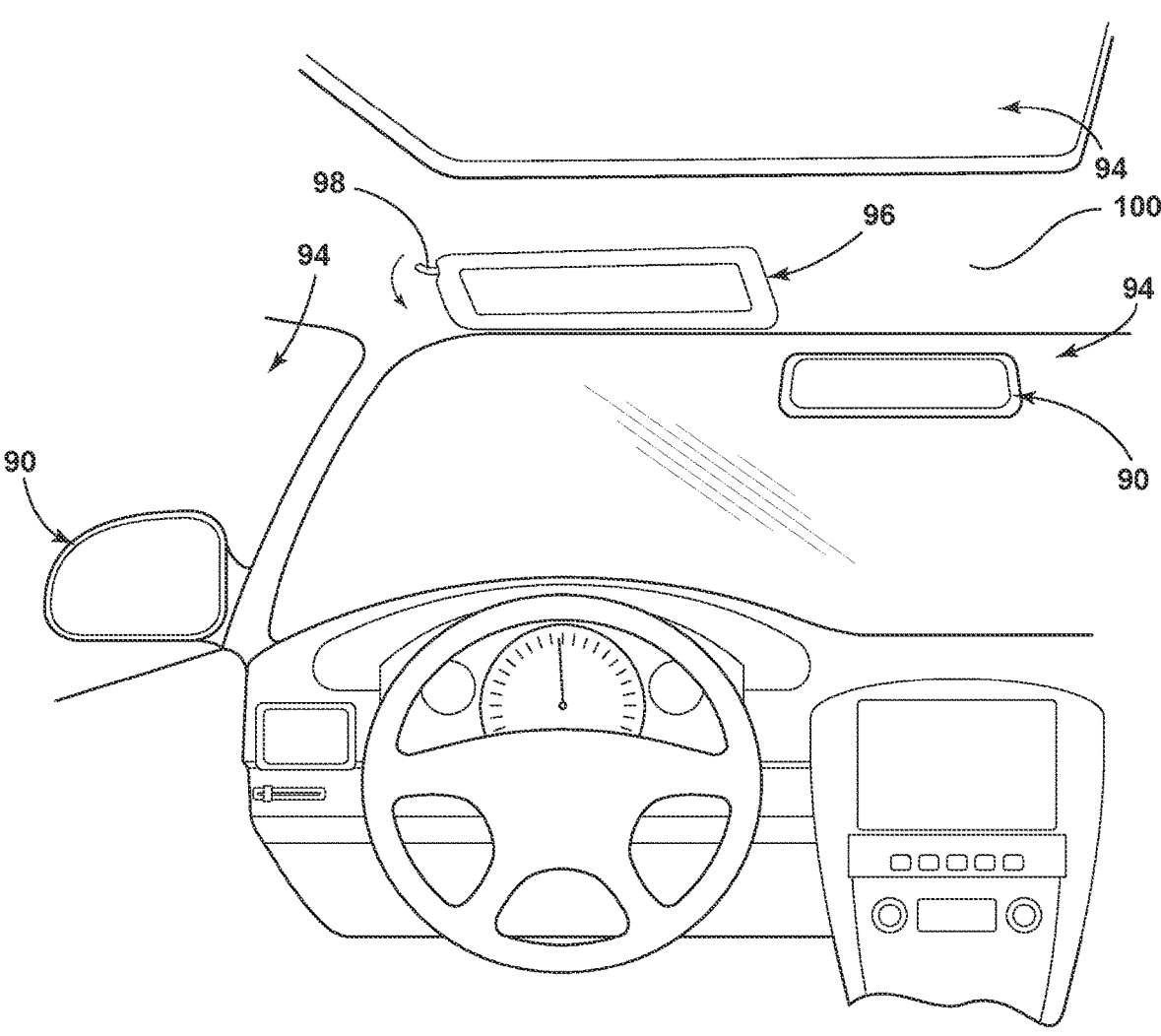
FIG. 8 in an interior perspective view of a vehicle incorporating one or more electro-optic devices, according to an aspect of the present disclosure.

Referring now to FIG. 8, the electro-optic devices 10, 110, 210, and 310 described herein may be incorporated into any number of environments, for example, an automobile, an airplane, other transportation vehicles, buildings, VR or mixed reality headsets, and/or the like. For example, the electro-optic devices 10, 110, 210, and 310 may be incorporated into a rearview assembly 90, a side rearview mirror 92, a window assembly 94 (e.g., front, side, rear, and/or sunroof window), or a visor assembly 96. More particularly, the visor assembly 96 may include a connection member 98 that extends between the visor assembly 96 and a ceiling 100 of the vehicle. The connection member 98 allows movement of the visor assembly 96 between a stowed position where the visor assembly 96 sits along the roof and an unstowed position where the visor assembly 96 is aligned with a driver or passengers field of view. The visor assembly 96 may include a frame 102 that at least partially surrounds a perimeter of the electro-optic device 10, 110, 210, and 310. In some embodiments, the light sources 32 contained in the electro-optic device 10, 110, 210, and 310 associated with the visor assembly 96 receive power through the connection member 98. In some embodiments, the light sources 32 contained in the electro-optic device 10, 110, 210, and 310 associated with the visor assembly 96 may automatically illuminate when the visor assembly 96 is moved to the unstowed position. In some embodiments, the visor assembly 96 may include and/or be in communication with a user interface (e.g., a button) to manually cause illumination of the lights sources 32 contained in the electro-optic device 10, 110, 210, and 310 associated with the visor assembly 96. The light sources 32 in the visor assembly 96 (or any other embodiments that include the reflective layer 79 or electrochromic medium and operate as a mirror) may be utilized to serve similar functions of light sources 32 in a partially transmissive, partially opaque configuration without the reflective layer 79. More particularly, the light sources 32 may limit a level of absorption, reflection, glare, or scattering from the reflective layer 79. In addition, the light sources 32 may provide illumination on a user when the electro-optic device 10, 110, 210, and 310 is in the unactivated state and the mirror (e.g., reflective layer 79) is utilized. In some examples, the electro-optic device 10, 110, 210, and 310 is one of many optical layers for a display, such as a heads-up display for the rearview assembly, a dynamic information display for icons, signage, or other graphical guides, or any other optical display through a substantially transparent assembly. In general, the at least one light source 32 may include a plurality of light sources and, more particularly, a plurality of LEDs 36. As will be appreciated, when the light sources 32 are activated locally, the light sources 32 may be selectively activated to generate words, letters, and graphics. It should be appreciated that, in some embodiments, the first and second substrates 12, 18 and, by extension, the first and second electrodes 24, 26, may each be planar, curved, or other shapes. For example, a sunroof window may require a certain level of curvature of the first and second substrates 12, 18 and, by extension, the first and second electrodes 24, 26.

Figure 9:
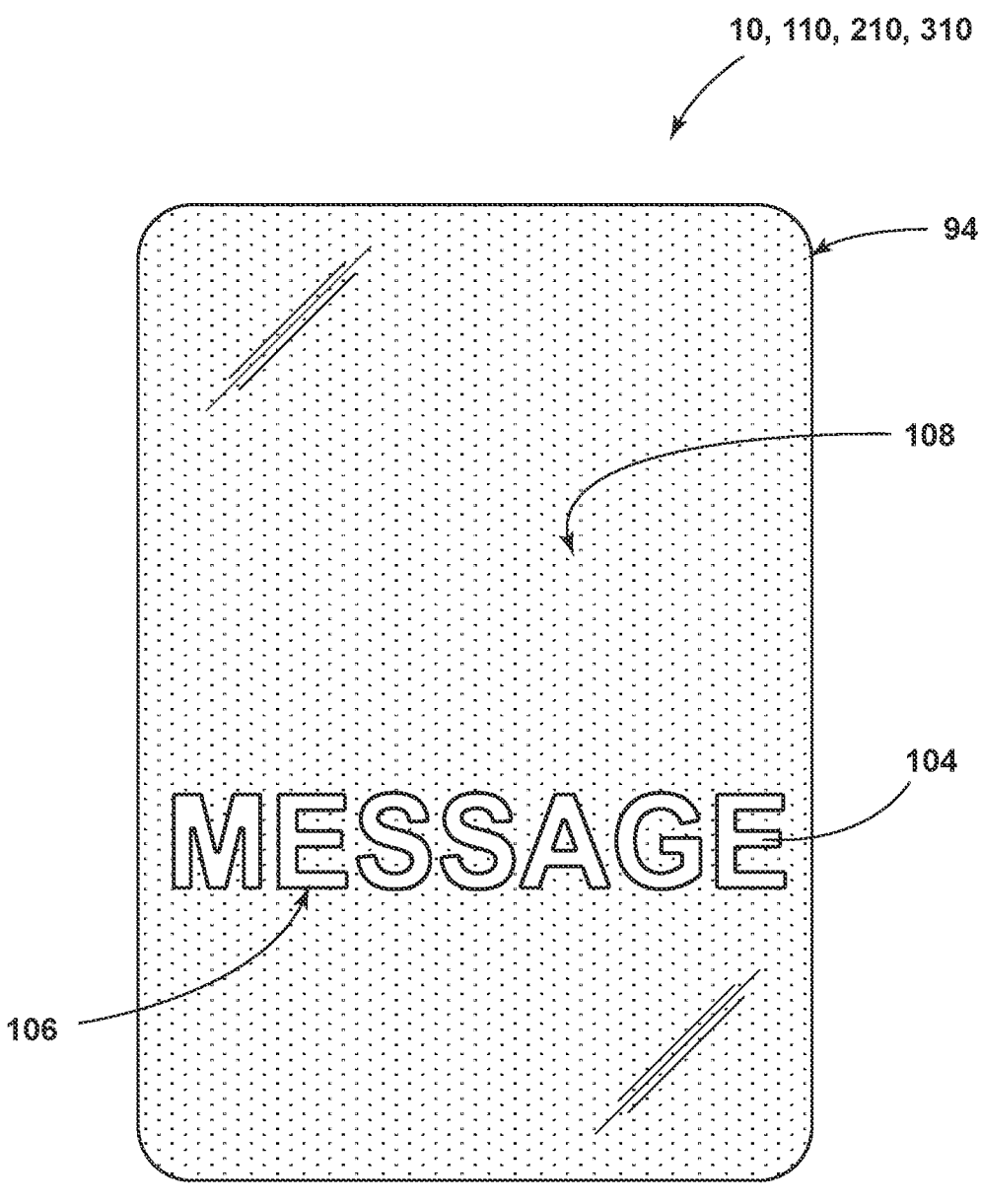
FIG. 9 is a front plan view of an electro-optic device employing one or more light sources to provide a visible indicator on the electro-optic device, according to an aspect of the present disclosure.

Referring now to FIG. 9, one example implementation of the previously described constructions of the electro-optic device 10, 110, 210, and 310 is illustrated in the form of the window assembly 94 that is configured to selectively display an indication 104, such as an insignia, a logo, a message, or any other visual indicator. The indication 104 may correspond to a first region 106 that incorporates the light sources 32 compared to a second region 108 with the light sources 32 omitted or differently configured. Alternatively, and as illustrated here, the indication 104 may be presented via employment of the diffractive optical element 74 overlaying the first region 106 and the second region 108 also includes light sources 32. Thus, in this example, a uniformity may be achieved in the second region 108 by activating the light sources 32 when the electro-optic element 34 is in a substantially activated state, and the indication 104 may be presented in the first region 106 due to scattering of the light in a pre-configured message in the diffractive optical element 74.

Figure 10A:
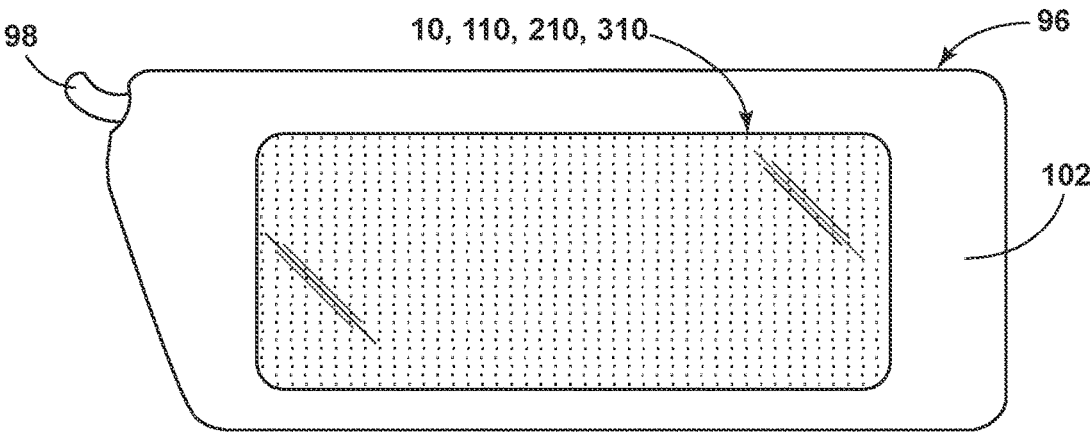
FIG. 10A is a front plan elevational view of a visor assembly incorporating an electro-optic device with a plurality of light sources distributed across an entire electro-optic element, according to one aspect of the disclosure.
Figure 10B:
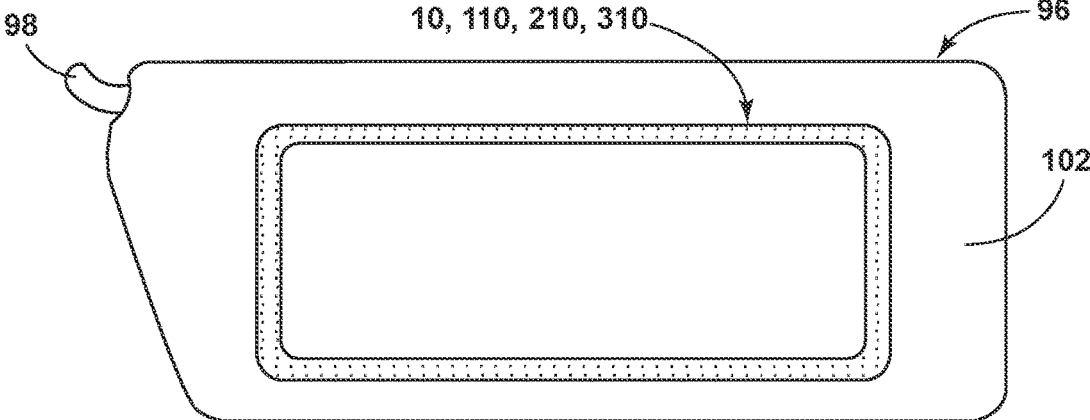
FIG. 10B is a front plan elevational view of a visor assembly incorporating an electro-optic device with a plurality of light sources distributed in a circular pattern, according to one aspect of the disclosure.
Figure 10C:
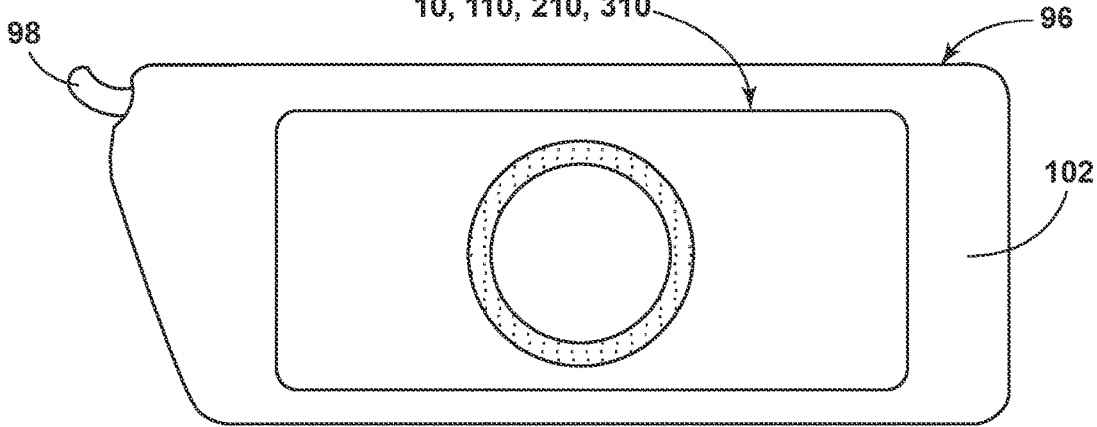
FIG. 10C is a front plan elevational view of a visor assembly incorporating an electro-optic device with a plurality of light sources distributed along a perimeter, according to one aspect of the disclosure.

Referring now to FIGS. 10A-10C, the electro-optic device 10, 110, 210, and 310 may include a reflective layer 79 and functions as a mirror in the unactivated state (e.g., such as in a rearview assembly 90, an side rearview mirror 92, or the visor assembly 96). In other embodiments, the electro-optic device 10, 110, 210, and 310 implemented in the rearview assembly 90, the side rearview mirror 92, or the visor assembly 96 may not include reflective layer 79. For example, the electro-optic device 10, 110, 210, and 310 used in the visor assembly 96 may be substantially transparent with the electro-optic medium 30 configured to reduce transmission of light. The frame 102 may define an opening that extends entirely through the frame 102 such that a user can view the environment through the electro-optic device 10, 110, 210, and 310 located in the opening. The frame 102 may fully or partially surround the electro-optic device 10, 110, 210, and 310.

The light sources 32 may be distributed in a manner to optimize illuminating a user's face without impacting the reflection from the reflective layer 79. For example, FIG. 10A illustrates the electro-optic device 10, 110, 210, and 310 including light sources 32 equally distributed across the entire electro-optic element 34, similar to FIG. 9. FIG. 10B illustrates the electro-optic device 10, 110, 210, and 310 including light sources 32 distributed in a pattern along the perimeter of the reflective layer 79 as not to impact the reflection from the reflective layer 79. FIG. 10C illustrates the electro-optic device 10, 110, 210, and 310 including light sources 32 distributed in a circular pattern within the perimeter of the reflective layer 79 so as not to impact the reflection from the reflective layer 79. The reflective layer 79 may be confined within the circular pattern. In some embodiments, the reflective layer 79 is the same size as the perimeter of the electro-optic element 34 (e.g., a perimeter of the electro-optic medium 30). In other embodiments, the reflective layer 79 is generally smaller than the perimeter of the electro-optic element 34 (e.g., a perimeter of the electro-optic medium 30). In this manner, portions of the electro-optic element 34 may be partially transmissive so that a viewer can see through the visor assembly 96 when the electro-optic element 34 is not in the activated state.

In general, the various constructions of the electro-optic device 10, 110, 210, and 310 may mitigate a dark reflective appearance by incorporating light sources 32 in a central portion of the electro-optic device 10. By projecting light toward the user side 38 directly, as opposed to edge-emitting light and a scattering layer, the haze level of the electro-optic device 10, 110, 210, and 310 may be reduced. The various optical layers previously described, such as the switching circuit region 60, the carrier 72, diffractive optical element 74, switching circuit region 60, carrier 72, or other optical layers may be incorporated into each of the constructions of the electro-optic device 10, 110, 210, and 310.

Incorporation of the light sources 32 with the electro-optic element 34, as described herein, may further allow for a rate reduction of the electro-optic device 10, 110, 210 by allowing a shared electrode layer between the electro-optic element 34 and the lighting circuits 80. For example, in the implementations in which the light sources are disposed in the electro-optic medium 30 (e.g., within the barrier 40), the number of conductive layers in the electro-optic device 10, 110, 210, and 310 may be reduced relative to incorporating LEDs 36 in a separate layer and/or on an electrically isolated circuit. For example, the overall thickness of the electro-optic device 10, 110, 210, and 310 may be in the range of between 300 and 500 micrometers, and a layer of the light source 32 may have a thickness in the range of 100 to 300 μm. Thus, integration of the light sources 32 with electro-optic element 34 may reduce packaging size for the electro-optic device 10.

The disclosure is further summarized in the following paragraphs and is further characterized by combinations of any and all of the various aspects described therein.

According to an aspect of the present disclosure, a device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. At least one third electrode layer is disposed adjacent to one of the first electrode layer and the second electrode layer. At least one light source operably electrically interposes the at least one third electrode layer and the one of the first electrode layer or the second electrode layer that is adjacent to the at least one third electrode layer.

According to another aspect, at least one light source is disposed between the second and third surfaces.

According to yet another aspect, a third electrode layer is disposed adjacent to a second electrode layer and an at least one light source is oriented to project illumination through the first substrate and the first electrode layer towards an intended viewer.

According to still yet another aspect, a third electrode layer is substantially co-planar to a second electrode layer.

According to another aspect, a second electrode layer defines a conductivity gap and a third electrode layer is located in the conductivity gap and out of contact with the second electrode layer.

According to yet another aspect, a third electrode layer is disposed adjacent to a first electrode layer and an at least one light source is oriented to project illumination through the first substrate towards an intended viewer.

According to still yet another aspect, a first electrode layer defines a conductivity gap and a third electrode layer is located in the conductivity gap and out of contact with the first electrode layer.

According to another aspect, an at least one light source is at least partially surrounded by an electro-optic medium.

According to yet another aspect, an at least one light source is located between a first electrode layer and a first substrate.

According to still yet another aspect, a diffractive optical element is configured to scatter light emitted from an at least one light source. The diffractive optical element is coupled to a first electrode layer on a side opposite an electro-optic medium.

According to another aspect, an at least one light source is at least partially surrounded by an electro-optic medium and a barrier is located between the electro-optic medium and the at least one light source.

According to yet another aspect, a barrier includes a potting material to limit contact of an electro-optic medium with an at least one light source.

According to still yet another aspect, a color of the potting material corresponds to a color of the electro-optic medium in a substantially activated state.

According to another aspect, a color of the potting material corresponds to a color of the electro-optic medium in a substantially unactivated state.

According to yet another aspect, a window assembly in a vehicle includes an electro-optic device.

According to still yet another aspect, reflective layer is coupled to a third or a fourth surface.

According to another aspect, a visor assembly in a vehicle includes an electro-optic device.

According to another aspect of the present disclosure, an electro-optic device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. A light source substrate includes a plurality of traces leading to a plurality of light sources, at least some of the plurality of light sources are aligned within a perimeter of the electro-optic medium and oriented to project illumination towards a viewing surface.

According to another aspect, the plurality of light sources includes micro-LEDs

According to yet another aspect, each of a plurality of light sources are spaced from an electro-optic medium by a barrier that includes a potting material.

According to still yet another aspect, a switching circuit region contains a plurality of thin-film transistors electrically interposing each of the plurality of light sources and at least one of a first electrode layer or a second electrode layer.

According to another aspect, a reflective layer is coupled to a third or a fourth surface and wherein the plurality of light sources are located between the reflective layer and the first surface.

According to yet another aspect, a light source substrate is located between a first insulating layer and a second insulating layer and the light source substrate includes a perimeter that at least partially extends past a perimeter of one of the first insulating layer or the second insulating layers.

According to yet another aspect of the present disclosure, an electro-optic device includes a first substrate that has a first surface and a second surface. A second substrate is spaced from the first substrate and has a third surface and a fourth surface. A first electrode layer is associated with the second surface. A second electrode layer is associated with the third surface. An electro-optic medium is disposed between the first and second electrode layers. The electro-optic medium is operable between substantially activated and substantially unactivated states based on changes to an electrical potential between the first and second electrode layers. A plurality of light sources located between the first surface and the fourth surface and disposed in a pattern at least partially aligned within a perimeter of the electro-optic medium and oriented to project illumination towards the first surface.

According to another aspect, a plurality of light sources are located between a first and a second electrode layer and are spaced from an electro-optic medium by a barrier.

According to yet another aspect, one of a first electrode layer or a second electrode layer that is adjacent to a plurality of third electrode layers defines a plurality of conductivity gaps and each of a plurality of third electrode layers are in one of a plurality of conductivity gaps.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An electro-optic device comprising:
a first substrate having a first surface and a second surface;
a second substrate spaced from the first substrate and having a third surface and a fourth surface;
a first electrode layer associated with the second surface;
a second electrode layer associated with the third surface;
an electro-optic medium disposed between the first and second electrode layers, the electro-optic medium operable between substantially activated and substantially unactivated states based on changes to an electrical potential between the first and second electrode layers;
at least one third electrode layer disposed adjacent to one of the first electrode layer or the second electrode layer; and
at least one light source operably electrically interposing the at least one third electrode layer and the one of the first electrode layer or the second electrode layer that is adjacent to the at least one third electrode layer.

2. The electro-optic device of claim 1, wherein the at least one light source is disposed between the second and third surfaces.

3. The electro-optic device of claim 2, wherein the third electrode layer is disposed adjacent to the second electrode layer and the at least one light source is oriented to project illumination through the first substrate and the first electrode layer towards an intended viewer.

4. The electro-optic device of claim 3, wherein the third electrode layer is substantially co-planar to the second electrode layer.

5. The electro-optic device of claim 3, wherein the second electrode layer defines a conductivity gap and the third electrode layer is located in the conductivity gap and out of contact with the second electrode layer.

6. The electro-optic device of claim 2, wherein the third electrode layer is disposed adjacent to the first electrode layer and the at least one light source is oriented to project illumination through the first substrate towards an intended viewer.

7. The electro-optic device of claim 6, wherein the first electrode layer defines a conductivity gap and the third electrode layer is located in the conductivity gap and out of contact with the first electrode layer.

8. The electro-optic device of claim 6, wherein the at least one light source is at least partially surrounded by the electro-optic medium.

9. The electro-optic device of claim 6, wherein the at least one light source is located between the first electrode layer and the first substrate.

10. The electro-optic device of claim 2, further including a diffractive optical element configured to scatter light emitted from the at least one light source, wherein the diffractive optical element is coupled to the first electrode layer on a side opposite the electro-optic medium.

11. The electro-optic device of claim 1, wherein the at least one light source is at least partially surrounded by the electro-optic medium and a barrier is located between the electro-optic medium and the at least one light source.

12. A window assembly of a vehicle including the electro-optic device of claim 1.

13. The electro-optic device of claim 1, further including a reflective layer coupled to the third or fourth surface.

14. A visor assembly including the electro-optic device of claim 1.

15. An electro-optic device comprising:
a first substrate having a first surface and a second surface;
a second substrate spaced from the first substrate and having a third surface and a fourth surface;
a first electrode layer associated with the second surface;
a second electrode layer associated with the third surface;
an electro-optic medium disposed between the first and second electrode layers, the electro-optic medium operable between substantially activated and substantially unactivated states based on changes to an electrical potential between the first and second electrode layers;
at least one third electrode layer disposed adjacent to one of the first electrode layer or the second electrode layer; and
at least one light source operably electrically interposing the at least one third electrode layer and the one of the first electrode layer or the second electrode layer that is adjacent to the at least one third electrode layer, and wherein at least some of the plurality of light sources aligned within a perimeter of the electro-optic medium and oriented to project illumination towards a viewing surface.

16. The electro-optic device of claim 15, wherein the at least one light source includes a plurality of light sources that include micro-LEDs.

17. The electro-optic device of claim 16, further including a reflective layer coupled to the third or fourth surface and wherein the plurality of light sources are located between the reflective layer and the first surface.

* * * * *